Nov. 25, 1969     E. A. ZANGER, JR., ET AL     3,479,716
AUTOMATIC DICE DISPENSER FOR SEMICONDUCTOR BONDING
Filed Dec. 5, 1966     7 Sheets-Sheet 1

INVENTORS.
EARL A. ZANGER, JR.
FREDERICK W. KULICKE, JR.
BY
Bilker Kimmelman & Mayerman
ATTORNEYS.

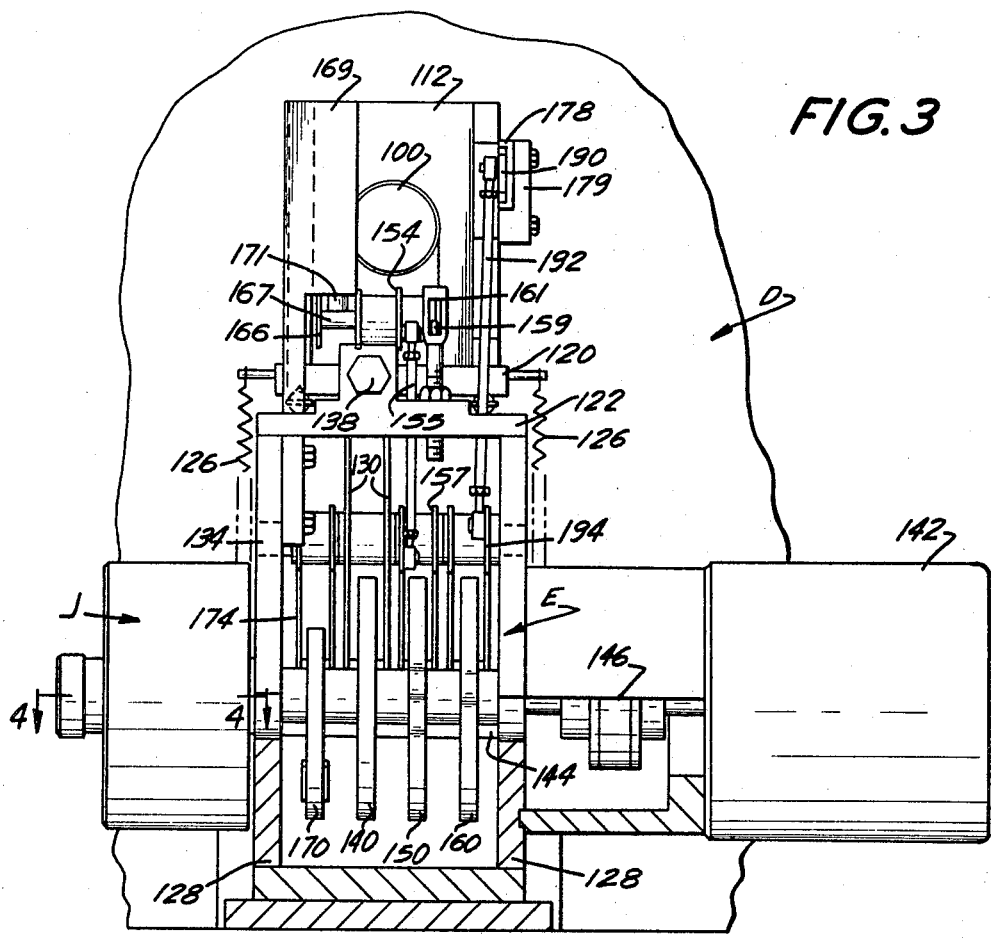
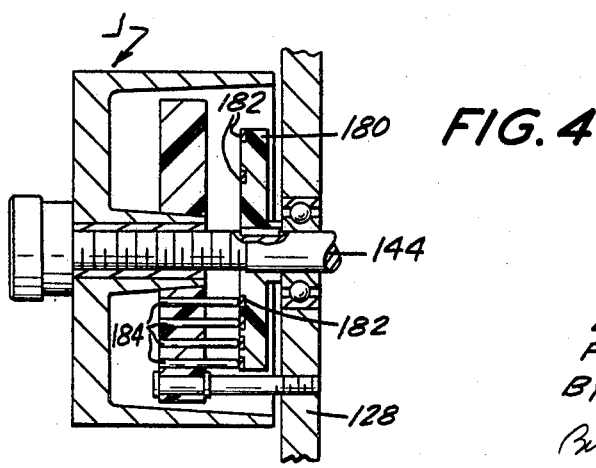

Nov. 25, 1969     E. A. ZANGER, JR., ET AL     3,479,716
AUTOMATIC DICE DISPENSER FOR SEMICONDUCTOR BONDING
Filed Dec. 5, 1966     7 Sheets-Sheet 4
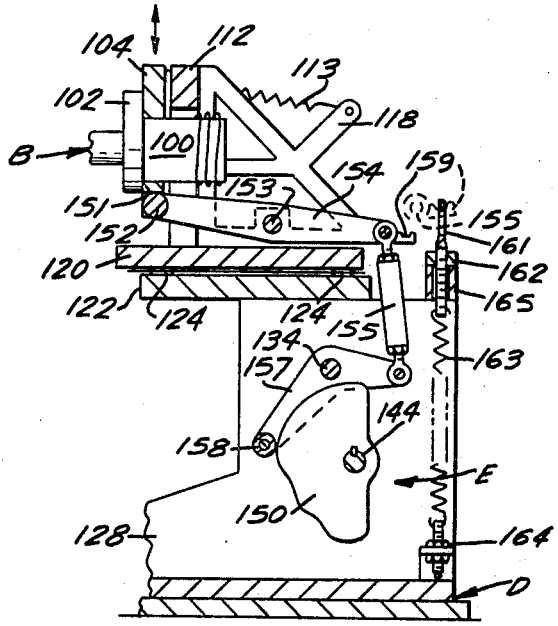
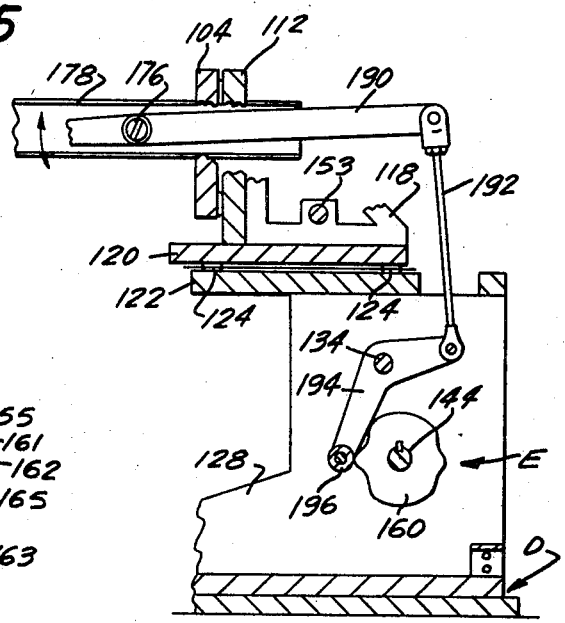
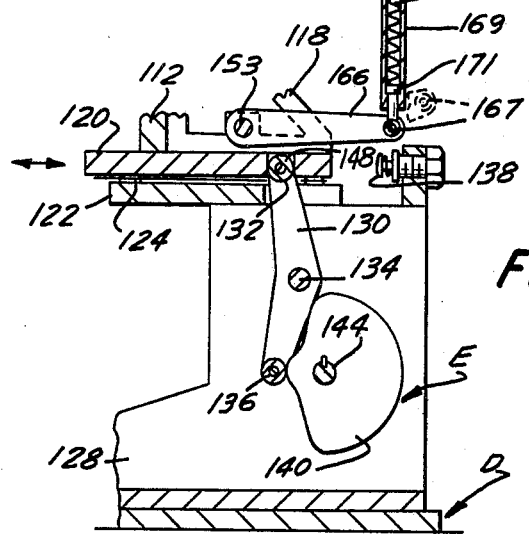
INVENTORS.
EARL A. ZANGER JR.
FREDERICK W. KULICKE, JR.
BY
ATTORNEYS

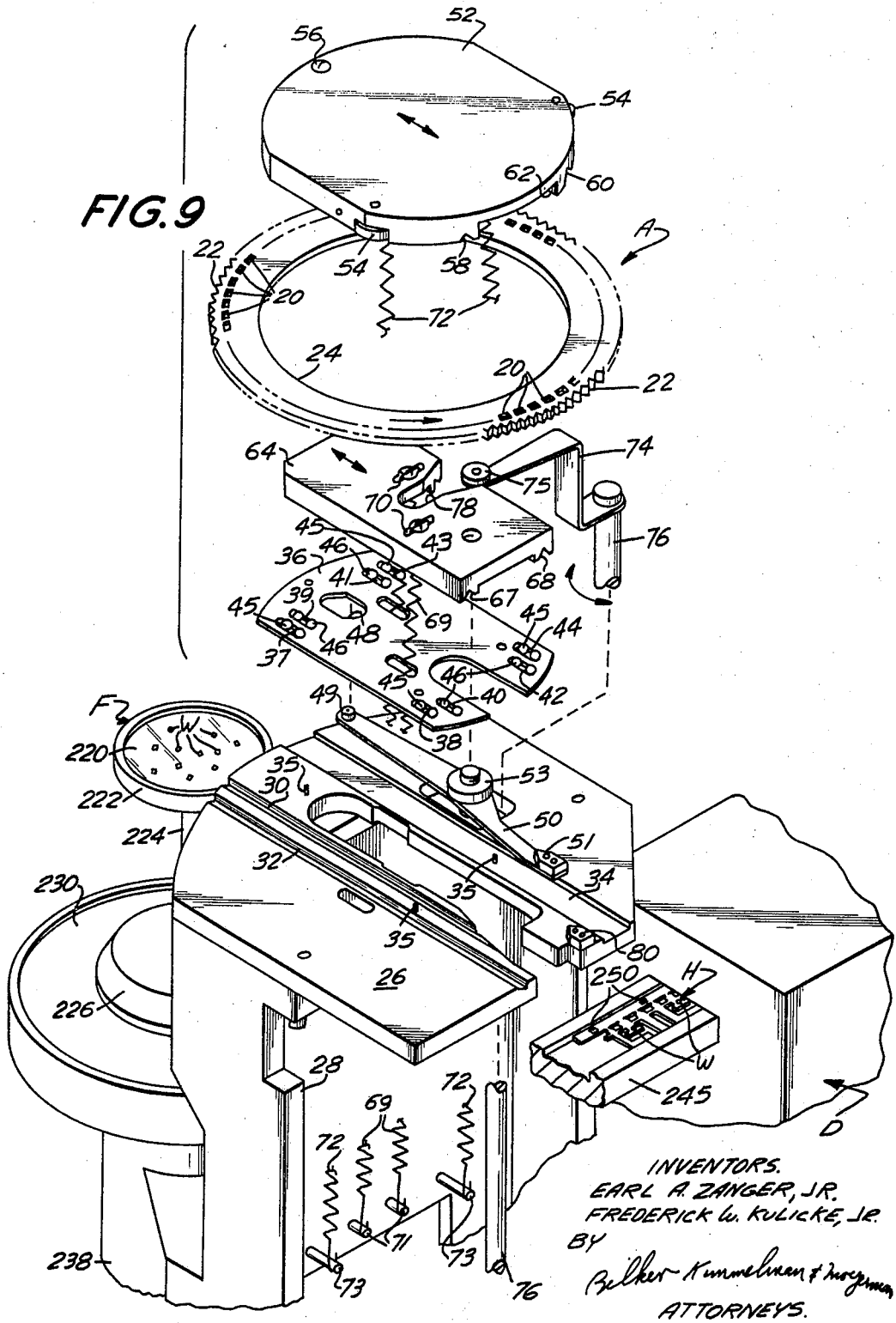

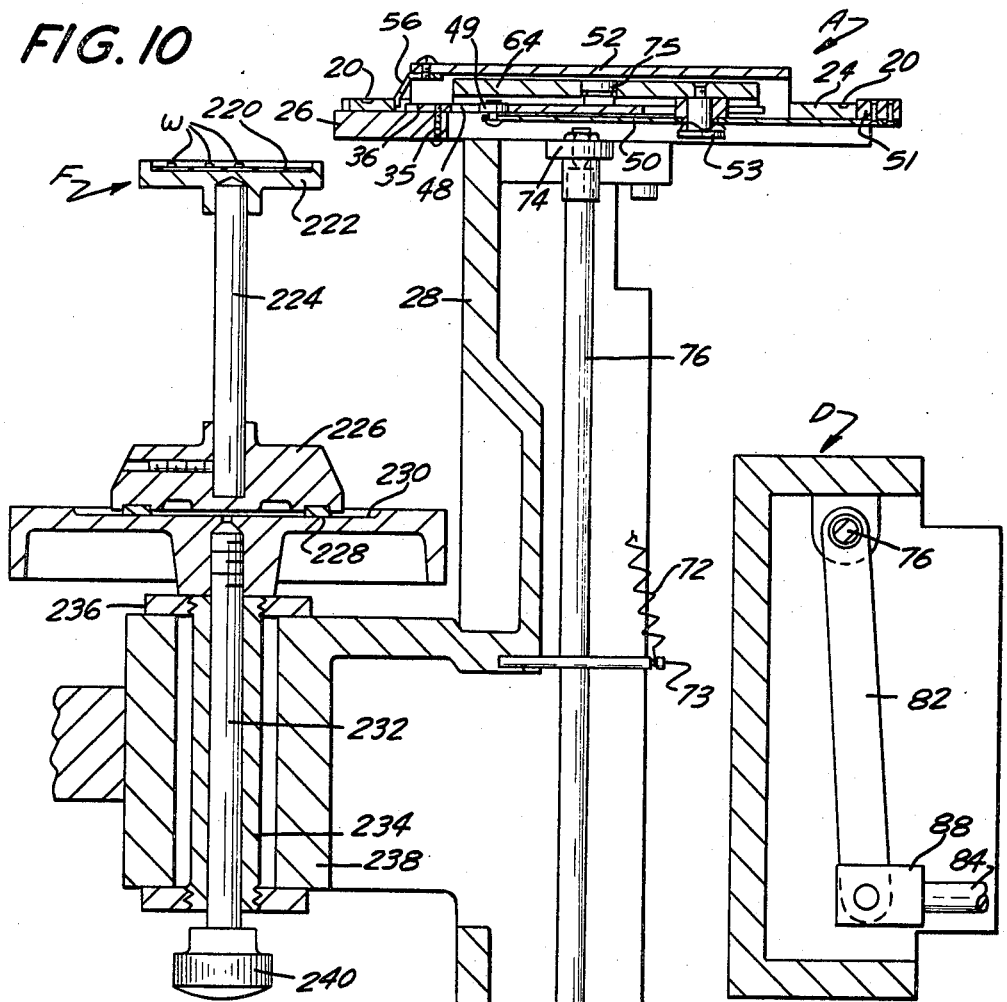

Nov. 25, 1969  E. A. ZANGER, JR., ET AL  3,479,716
AUTOMATIC DICE DISPENSER FOR SEMICONDUCTOR BONDING
Filed Dec. 5, 1966  7 Sheets-Sheet 7

INVENTORS.
EARL A. ZANGER, JR.
FREDERICK W. KULICKE, JR.
BY
Arthur Kimmelman & Morganman
ATTORNEYS

United States Patent Office 3,479,716
Patented Nov. 25, 1969

3,479,716
AUTOMATIC DICE DISPENSER FOR SEMICONDUCTOR BONDING
Earl A. Zanger, Jr., and Frederick W. Kulicke, Jr., Philadelphia, Pa., assignors to Kulicke & Soffa Industries, Inc., Fort Washington, Pa., a corporation of Pennsylvania
Filed Dec. 5, 1966, Ser. No. 599,181
Int. Cl. B65g 59/04; B65h 3/08
U.S. Cl. 29—203                                        7 Claims

ABSTRACT OF THE DISCLOSURE

An automatic dice dispenser in which semiconductor wafers are loaded into an indexing tray having individual pockets with downwardly converging walls. The tray then advances and positions one wafer die at a time in successive pockets into registration with a pick-up and bonding tool which grasps the referenced die and delivers it to a successively referenced mounting base.

---

This invention relates to an apparatus and system for assembling semiconductor devices. More particularly, it relates to a means and method for successively feeding, positioning and then automatically securing semiconductor dice, integrated circuit slices or microcircuit wafers to headers and/or device mounting bases with great speed and precision.

In the manufacture of semiconductor devices, such as transistors, diodes and microcircuits, a body of semi-conductive material, called a "wafer" or "die," is generally first secured upon a usually conductive mounting base, called a "header" or "substrate." Thereafter wire electrode leads are bonded to junctions on the wafer, such junctions being referred to as its "geometry." At the present time, a typical semiconductor die may be about .010 to .020 inch square and in the order of a few thousands of an inch thick.

Originally, the wafer and wire bonding operations were performed on an individual or one-at-a-time basis whereby a single die would be placed on a header by means of tweezers, and later by a pick-up tool, in the hands of an operator. This die was then singly secured to the header or substrate by eutectic and/or ultrasonic bonding systems before proceeding with the next unit or the next operation. The eutectic bonding utilized a temperature above eutectic while ultrasonic bonding generally used a combination of heat and ultrasonic scrubbing at a temperature around the eutectic. In recent years, the art has developed to the extent that a plurality of the headers or mounting bases are now handled collectively by carrier units for transport through wafer bonding work stations sequentially at production speeds. These carrier units which integrate the substrates or mounting bases include indexable metal tapes, taped wire leads, known as 3-wire systems, reels of stamped transistor frames and, even more recently, magazine-held stamped or chemically milled transistor or microcircuit frames.

While many different pieces of apparatus have been developed to advance the many and varied types of carrier units through the work stations, up to this time, the systems for picking up, delivering, accurately positioning and then bonding the wafers and/or dice to the consolidated mounting bases have been relatively crude and necessitated considerable operator manipulation. That is, although registration of the header bases or tabs could be achieved by sundry means, heretofore, the operators were required to perform by hand some appreciable degree of micro-positioning in either picking up the tiny wafers from a dice dish and/or in manipulating the lifted dice relative to the oriented header in order to effect bonding.

The present system is also applicable to what has been termed a "flip-chip" die in which the active surface of the die is first placed face down upon a lead pattern on a substrate. Another application of the present system is in the accurate placement of ceramic capacitors and dice on substrates. Both soldering and ultrasonic bonding techniques can be used for securing these parts.

It is therefore an object of this invention to provide means for rapidly and yet very precisely feeding, positioning and securing miniature and sub-miniature devices with respect to a mounting base, substrate or header.

Another object of this invention is to provide an apparatus and method for automatically orienting wafers with respect to the header or base components to which they are to be secured.

Still another object of this invention is to provide a semiconductor dice pick-up and feeding system which will easily accommodate all of the known carrier units in use to date.

Yet another object of this invention is to provide an automatic miniature device feeding and bonding apparatus which is readily adapted for all existing bonding die techniques, including eutectic, ultrasonic, and other vibratory bonding systems.

Yet a further object of this invention is to provide an automatic dice registration and dispensing system which is adapted for handling all wafer configurations.

A still further object of this invention is to provide a semiconductor wafer dispensing and bonding apparatus and method which will yield maximum production schedules with minimum dice damage.

Another object of this invention is to provide a miniature device or dice pick-up dispensing, positioning and bonding apparatus which can be loaded rapidly and which will operate smoothly without jamming or sticking.

Other objects of this invention are to provide an improved apparatus and method of the character described that is easily and economically produced, which is sturdy in construction, and which is highly effective and efficient in operation.

With the above and related objects in view, this invention consists of the details of construction and combination of parts as will be more fully understood from the following detailed description when read in conjunction with the accompanying drawings, in which:

FIGURE 3 is a sectional view taken along lines 3—3 of FIGURE 1.

FIGURE 4 is a sectional view taken along lines 4—4 of FIGURE 3.

FIGURE 5 is a sectional view taken along lines 5—5 of FIGURE 2.

FIGURE 6 is a sectional view taken along lines 6—6 of FIGURE 2.

FIGURE 7 is a sectional view taken along lines 7—7 of FIGURE 2.

FIGURE 8 is a sectional view taken along lines 8—8 of FIGURE 2.

FIGURE 9 is an enlarged exploded perspective view of the indexing and registration system embodied in this invention.

FIGURE 10 is a sectional view taken along lines 10—10 of FIGURE 2.

FIGURE 11 is a sectional view taken along lines 11—11 of FIGURE 10.

FIGURE 12 is a sectional view taken along lines 12—12 of FIGURE 10.

Figure 1:
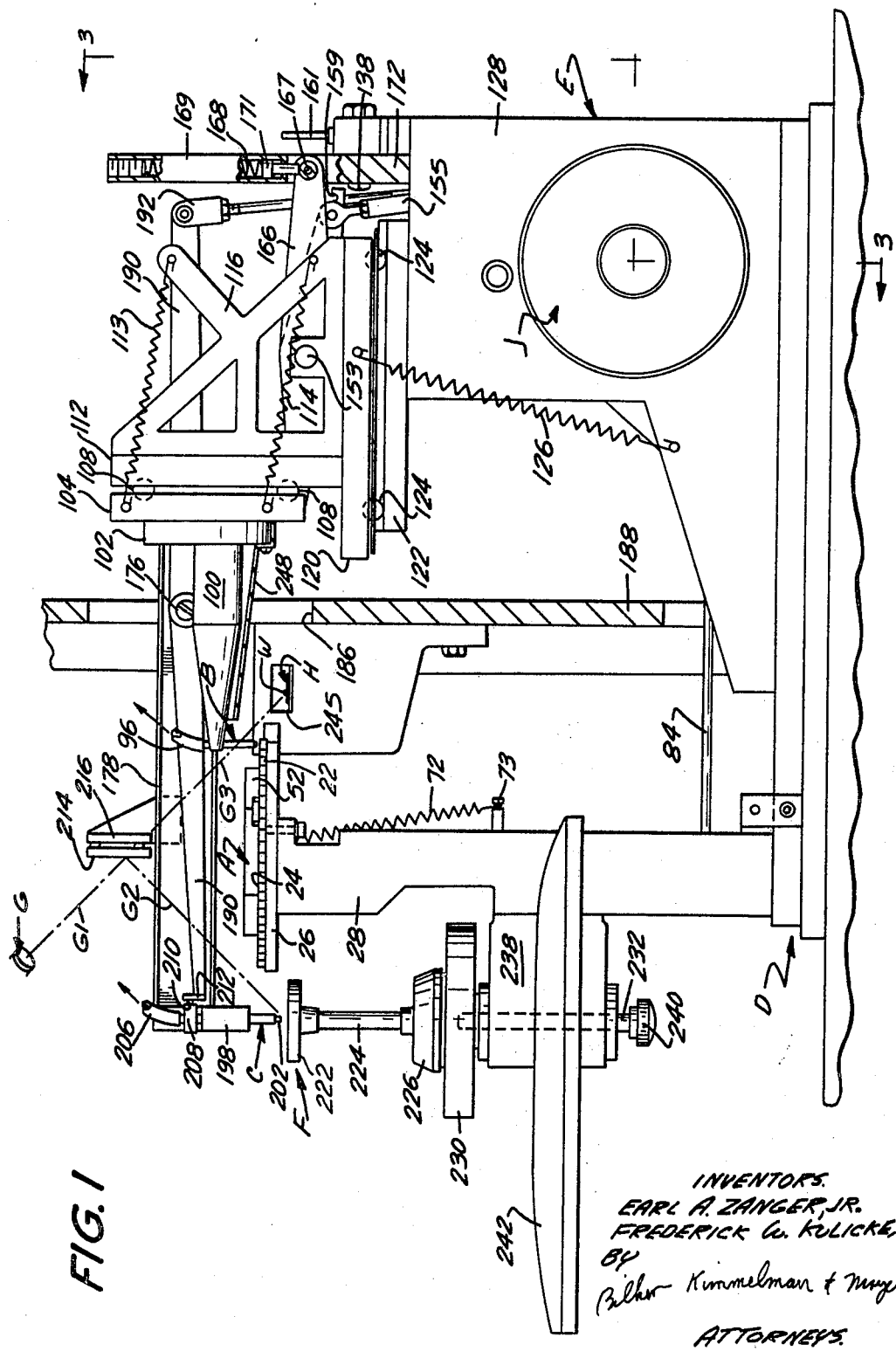
FIGURE 1 is a side elevational view of an automatic semiconductor wafer dispensing and bonding tool embodying this invention.

Referring now in greater detail to the drawings in which similar reference characters refer to similar parts, we show an apparatus for dispensing and securing semiconductor wafers W to mounting bases or headers comprising a compartmentalized dice tray indexing assembly generally designated as A, a die collet and bonding tool, generally designated as B, and means to load the dice tray, generally designated as C.

Figure 2:
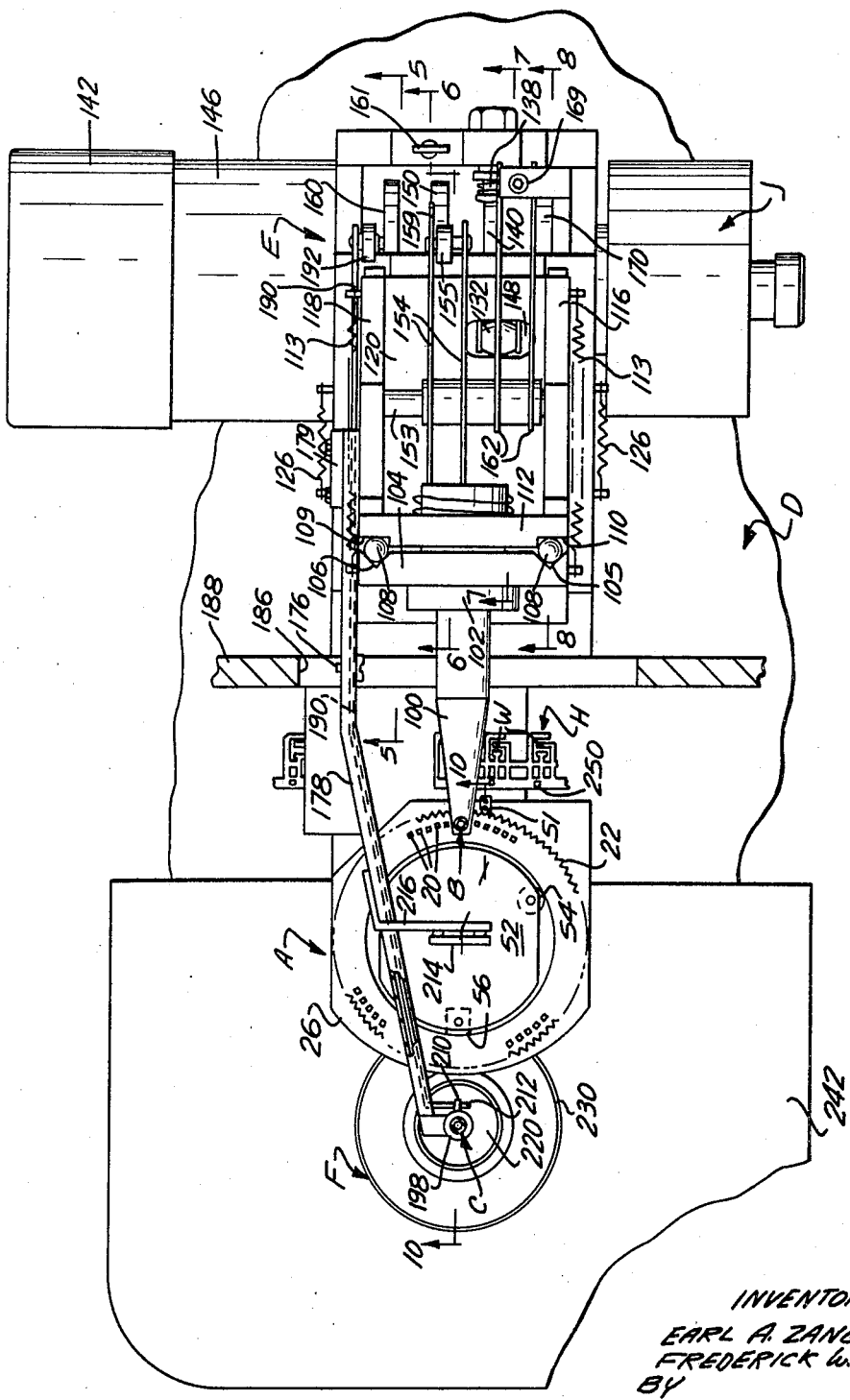
FIGURE 2 is a top plan view thereof.
Figure 14:
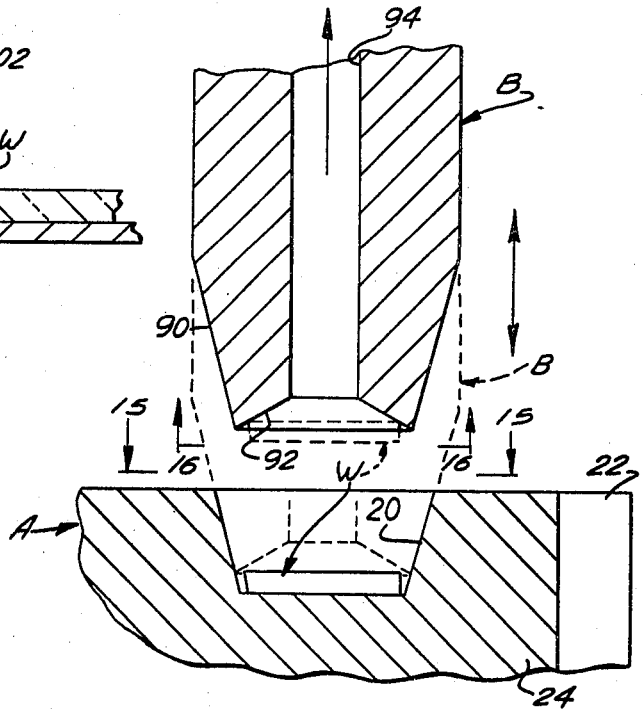
FIGURE 14 is a sectional elevational view taken through the bonding tool.

As shown on FIGURES 1, 2 and 9, the dice W are loaded into recessed pockets 20 which are circumferentially spaced about the margin of the rotary tray A. The recesses 20 are precisely oriented with respect to indexing teeth 22 at the periphery of the tray and are preferably coined therein. Each of the recesses 20 has a configuration complementary with the perimeter of the dice and sloping side walls for directing a die into a predetermined orientation. The collet B has a tapered end, as best shown in FIGURE 14, which is complementary with the sloped side wall periphery of the pockets 20. When the collet B is allowed to descend into a particular pocket 20 in position, it is gently guided therein so that the pocket walls align the collet tip precisely over and in spaced registration with the wafer W lying in that pocket. Vacuum applied through the bore of the collet B sucks the die within the cupulate end which is also complementary with the die configuration. The collet is next elevated out of mating engagement with the pocket and then into registration with a mounting base, which are shown here coupled in a strip or tape H. See FIGURES 2 and 9. Next, the collet B with its captured die descends into engagement with the particular header or mounting base and bonds the wafer thereto by eutectic bonding techniques using ultrasonic or other vibratory means to assist the bonding. When the bond is completed, the collet B is elevated, and indexing of the tray A is rotatably actuated through one notch of arc. The next pocket loaded with a fresh die W is accordingly rotatably indexed into a precise position for receiving the collet during its next dispensing cycle. The dice W may be loaded into the pockets by the pick-up tube C, shown here one at a time, or preloaded in bulk at the station or at a remote location.

Figure 15:
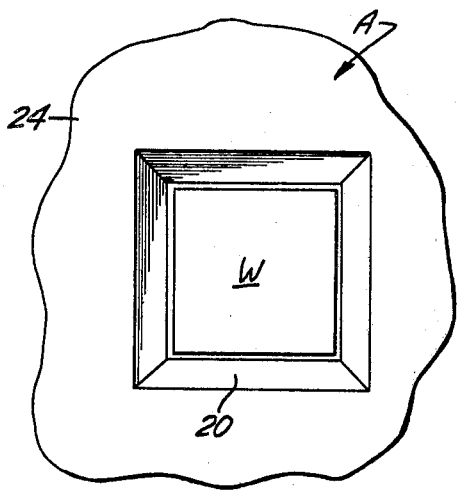
FIGURE 15 is a sectional view taken along lines 15—15 of FIGURE 14.

Referring to FIGURES 9, 14 and 15, the pockets 20 are square in plan section for dice having a square configuration and are preferably coined into ring or disk 24. The pockets are regularly spaced circumferentially about the perimeter of the disk 24. For use with a typical die approximately .015 to .020 inch square, the bottom of the pocket may be .021 inch square and recessed approximately .015 inch below the surface with walls sloping at an angle of 30°. Each pocket 20 is precisely located with respect to its respective tooth 22 at the edge of the ring 24. A plurality of inner concentric circles of pockets 20 may be also incorporated in the ring 24 on smaller radii than as illustrated, but their spacing about a polar axis must be identical to the spacing of the teeth 22.

As shown in FIGURES 1, 2, 9 and 10, the ring 24 rests directly upon a guideway plate 26 which stands as a pedestal on main support member 28 and apparatus frame D. The upper surface of the guideway plate 26 has a pair of parallel V-shaped tracks 30 and 32 which define respectively inner and outer ball raceways with rectilinear track 34. Ball separator 36 is affixed by screws 35 upon the surface of the guideway plate 26 with elongated openings 37 and 38 registering with track 32, with elongated openings 39 and 40 registering with track 30, and with openings 41, 42, 43 and 44 superimposed over rectilinear track 34. Paired sets of balls 45 and 46 are mounted respectively within each of the outboard and inboard slotted openings and are rotatably supported within respective races as constrained by the separator or cage 36. In addition to the ball separator function, the cage 36 also has a slotted cam 48 which has the general configuration of a parallelopiped and is adapted to actuate indexing lever 50 for rotating the ring 24 one tooth at a time.

Top slider member 52 is longitudinally reciprocable upon the guideway plate 26 and, at the same time, rotatably retains about its periphery the ring 24. Rollers 54 and tail springs 56 extend outwardly from the slide 52 and are triangularly positioned about the inner marginal edge of the ring annulus. A pair of parallel inverted V-races 58 and 60 in the lower surface of the top slider 52 register with the track 32 and the outboard portion of track 34 whereby the top slider is adapted to roll to-and-fro on the balls 45 in the outer races. The lower surface of the slider 52 is also recessed at 62 intermedate the races 58 and 60 to receive inner slider member 64.

The under surface of inner slider 64 has a pair of parallel inverted V-races 66 and 68 which register with the track 30 and the inboard portion of track 34. Thus, the inner slider 64 is reciprocable within the top slider and glides on the balls 46 in the interior races of the trackway 26. Springs 69 coupled at 70 to the inner slider 64 and upon hangers 71 on the support 28 bias the inner slider against the inner races in guideway plate 26. Springs 72 upwardly extending from hangers 73 similarly resiliently urge the top slider 52 against the outer races of the guideway plate 26. As seen from FIGURE 9, the hangers 73 are longer than hangers 71 and therefore allow a horizontal component of the spring tension to urge the top slider from left to right in FIGURES 1 and 10.

The indexing lever 50 is pivotally supported from the under portion of inner slider 64 by a suitable bearing 53. The left hand end of the lever 50, as shown in FIGURE 9, has a follower roller 49 which is encircled by slotted cam 48 in the ball cage 36. The forward end of the lever 50 has a pointed indexing finger or pawl 51 which is adapted to engage the peripheral notches between teeth 22 on the ring 24 and cause rotation thereof one tooth at a time.

Stroke arm 74 mounted on end of actuator shaft 76 has a roller 75 which engages within slot 78 in the inner slider member 64. The springs 69 which bias the inner slider 64 against the guideway plate 26 at the same time urge the inner slider from left to right against the stroke arm roller 75, as shown in FIGURES 1 and 10. The counter-clockwise pivotal position of the stroke arm 74 causes the inner slider 64 to move to the right, as shown in FIGURE 9, until the follower 49 of lever arm 50 is engaged by the right hand portion of the cam slot 48. At this position, indexing finger 51 is fully disengaged from the teeth 22 and poised in a clockwise direction. At the very same time, springs 72 bias the top slider 52 from left to right which causes biasing of the ring 24 to the right until a notch 22 is engaged by fixed lock pawl 80 secured to the right hand upper edge of guideway plate 26.

Clockwise pivotal motion of actuator shaft 76 and stroke arm 74 causes the inner slider 64 to move to the left, as shown in FIGURES 1, 2, 9 and 10. Since the indexing lever 50 also moves to the left, indexing finger 51 will move into a notch 22 of the ring 24. Further rearward motion of inner slider 64 causes the indexing finger 51 to pull the entire ring 24 leftward until the teeth 22 are fully disengaged from lock pawl 80. When the follower 49 abuts against the back surface of cam slot 48, it will effect counter-clockwise pivotal motion of the indexing lever 50 and pawl 51 will move over one notch. Accordingy, the ring 24 rotates through an arc approximately the pitch of one tooth 22. The shaft 76 and stroke arm 74 will now have begun to move counter-clockwise so as to move inner slider 64 to the right until indexing finger 51 is withdrawn from engagement with the notch 22. Spring 72 accordingly biases top slider 52 to the right and pushes the now advanced notch 22 into positive and accurately indexed position with lock pawl 80. Further forward motion of the inner slider 64 allows the follower 49 to ride up on the front angled face of cam slot 48 and cock the indexing lever 50 in preparation of the next indexing cycle. The lower portion of actuating shaft 76 is rotatably supported on cone bearing 79 and has a crank arm 82 coupled thereto. Crank arm 82 is pivotally operated through wrist 88 by reciprocation of rod 84 which is itself actuated in proper sequence by automatic programming assembly E. See FIGURES 3 and 8.

Figure 16:
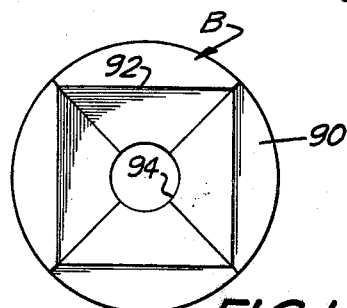
FIGURE 16 is a sectional view taken along lines 16—16 of FIGURE 14.

Referring now to FIGURES 1, 2 and 14, the motion of the tool B is forced downwardly from a poised position above a pocket 20 loaded with a wafer W in the indexing ring 24. The tool B automatically descends and is guided into a precise location over the die W lying at the bottom of the pocket. The tip of the tool or collet B has a rectangularly configured tapered exterior 90 which is exactly complementary with the sloping walls of the pockets 20 and has a concave or cupulate cavity 92 slightly greater than the wafer cross-section. However, the cross-section of the very end of the collet is such that the tapered walls 90 bottom against the sloping pocket walls before the tip engages the wafer W. Hence, the tip of the collet B remains spaced from the die W lying in the pocket 20 so as to prevent crushing or edge damage of the wafer. Next a vacuum is applied to the cupulate end 92 of the collet B through bore 94 and tubing 96 communication with an exhaust system. The depth of the cupulate cavity 92 is shallower than the thickness of the wafer W and enables a portion of the die to project below for bonding when held gently but firmly within the cuplate end. As shown in FIGURES 14 and 16, the cavity 92 has a pyramidally-shaped or internally-sloped roof. The concave pyramidal cavity is employed for grasping the edges of the die only, as is set forth in prior U.S. patent application, Ser. No. 404,035 filed Oct. 15, 1964 now abandoned by Earl A. Zanger, Jr. et al. for an invention in "Semiconductor Wafer Pick-up and Bonding Tool." Thus, the sloped roof of the tool cavity 92 abuts against the line of intersection of the edge and upper surface planes of the die at opposing ends thereof.

As shown in FIGURES 1 and 2, the die collet B is supported at the end of an ultrasonic energy vibratory device 100, such as is set forth in prior U.S. patent application Ser. No. 346,567, filed Feb. 21, 1964 by Edmund P. Haigler, now Patent No. 3,314,582 for an invention in "Ultrasonic Bonding Instrument." The ultrasonic vibrator 100 is mereily intended to be illustrative of a bonding method, and any other bonding system can be employed, such as thermocompression bonding illustrated in prior U.S. Patent No. 3,083,291. As embodied herein, the ultrasonic bonding device 100 is supported by an adjusting collar 102 within vertical slider 104. Parallel spaced rails 105 and 106 in vertical slider 104 vertically glide on balls 108 supported in races 109 and 110 in vertical guideway plate 112. Springs 113 and 114 hung on lateral support members 116 and 118 resiliently draw the slider 102 in vertically slidable disposition against the face of vertical guideway 112.

Horizontal slider plate 122 supports both the vertical guideway 112 and lateral supports 116 and 118. Trackway plate 122 having parallel horizontal tracks permits smooth reciprocable motion on balls 124 of the slider plate 120 in a horizontal direction. Springs 126 mounted on programmer support plates 128 resiliently draw the slider 120 into face-to-face abutment with the horizontal trackway 122. Reciprocating motion of the slider plate 120 is produced by crank 130 of the programming assembly E, as best shown in FIGURE 7. It is to be observed that the springs 126 bias the slider 120 from right to left, as shown in FIGURES 1 and 7, so that drive roller 132 abuts against the rear surface of slot 148 in which it is guided. The crank 130 is urged counter-clockwise about pivot shaft 134 and follower 136 is maintained against the surface of cam 140. Resilient spring stop 138 maintains the follower 132 against the rear wall (right hand surface) of actuating slot 148 for the horizontal slider 120 when the latter is driven to the right as shown in FIGURE 7. The right hand position of slider 120 determines the reference position of the die collet B when the wafer W is to be bonded to the header H.

The programming assembly E shown in FIGURES 2 and 3 comprises a single revolution motor 142, of the synchronous type or equivalent, which is supported on plate 128 and drives cam shaft 144 through a reducing gear train and clutch 146. As stated hereinbefore, cam 140 is keyed to the shaft 144 and actuates horizontal reciprocation of the bonding collet B through slider 120, as shown in FIGURE 7. It also horizontally reciprocates the pick-up or feed tool C, as will be demonstrated later. Cam 150 actuates vertical reciprocation of the vertical slider 104, as best shown in FIGURE 6. Cam 160 actuates vertical reciprocation of the pick-up or feed tube C, as shown in FIGURE 5 and as will be set forth in greater detail hereinafter. Cam 170 operates the rotary indexing of the dice tray A and ring 124, as shown in FIGURE 8. As shown in FIGURE 4, a commutator disc 180 is also coupled to the shaft 144 and has a plurality of conductive segments 182 disposed on the surface thereof and engaged by brushes 184, the latter being electrically connected to actuating valves (not shown) for coupling the vacuum to the collet B and the pick-up tube C as required. The commutator disc 180 and its brushes 184 are also part of a cycle start assembly J for triggering the movement of the tape H and initiating the rotation of motor 142, automatically or on demand.

Referring to FIGURE 6, the vertical slider 104 by its own weight is urged downwardly and has a notched lower portion 151 which engages the bottom roller 152 at end of lever 154. Lever 154 is pivoted on trunnion 153 mounted within bosses upstanding from supports 128 and has its opposite end coupled to turnbuckle 155. The lower end of turnbuckle 155 is connected to one end of crank 157 pivoted upon shaft 134. Thus, cam follower 158 is urged against the surface of cam 150 by virtue of the load imposed by the slider 104 and its associated carriage components. However, since the mass of the vertically reciprocable carriage which holds the die collet B is extremely large, counterbalance means are provided to prevent jolt from undue momentum wafer as the collet is lowered against the header H for bonding or within the pockets of the tray A for pick-up.

As shown in FIGURE 6, the rear portion of the lever 154 has a hook 159 which is adapted to be received within an eye 161 when the horizontal slider 120 is driven to the right. The eye 161 is threaded within a nut 162 and is further secured to the upper end of coil spring 163. The coil spring 163 is already pretensioned between hanger member 164 affixed to the bottom of the frame D and by virtue of the nut 162 seated upon sleeve 165 at the top. Thus, when the slider 120 is moved against bumper 138, the hook 159 is engaged by the eye 161. Rotation of the cam 150 causes the hook 161 to move upwardly against the bias of the counter spring 163 when the vertical slider is lowered. See dotted portion of FIGURE 6. Therefore, the jolt of the die collet B as it lowers the wafer upon the header for bonding is taken up by the counter tension force of the spring.

The same counterbalancing of the mass or momentum of the descending slider 104 is taken up at the forward portion of the stroke of the horizontal slider 120 when collet B is depressed into the pockets 20 for pick-up. See FIGURE 7. A link 166 is keyed to the very same trunnion 153 which supports the rocking lever 154. The link 166 has a transversely extending roller 167 which is adapted to engage upon and against the bias of a compression spring 168. This engagement occurs when the slider 120 is at its left most position and when the link 166 is rotated counter-clockwise, as shown in FIGURE 7. The compression spring 168 is mounted within a casing 169 and is compressed against a piston member 171 slidably projecting through the bottom of the casing. As shown in FIGURE 2, the casing 169 is mounted on a column 172 upstanding from support member 128 so that full clearance from the bottom of the casing and the bottom of the piston 171 is provided for the link 166 and its roller 167 in all positions except descent of the collet B into the pocket 20 of indexing tray A. When the roller 171 is urged upwardly against the downwardly biased piston 171, the shock of the collet B descending into a pocket 20 is reduced to a gentle pillowing effect and thereby prevents damage to the collet B, to the pocket walls 20, and to the wafer W itself.

In FIGURE 8 is shown the programming action of the tray indexing cam 170 which moves against follower 173 supported on crank member 174. The crank 174, as are the other crank members, is also rotatably mounted on shaft 134. The lower portion of crank 174 is coupled to the operating rod 84 which actuates shaft 76 and stroke arm 74. Indexing of the tray assembly A occurs after the bond has been made and during ascent of the die collet B from bonding position.

Referring now to FIGURE 5, there is shown the programming cycle for the pick-up tube C which is used for loading the pockets 20 of the indexing tray assembly A. The pick-up tube C lifts a wafer W from a manipulatable dice dish F at the same time that the collet B descends into a pocket 20 for capturing an oriented die. The pick-up tube C moves upwardly and to the right to a level above the tray A, as shown in FIGURE 1, at the same time that the die collet B is elevated out of the pocket 20 and then to the right above the header H. Next the pick-up tube C is lowered slightly and deposits the lifted wafer into a pocket 20 at the left-hand portion of FIGURE 1 while the collet B descends and positions an accurately oriented die for bonding on the header H. The other portion of the cycle is essentially the reverse. As a consequence, the horizontal reciprocations of both the die collet B and the pick-up tube C are performed simultaneously and conducted by the horizontal slider 120 as actuated by cam 140. However, while vertical movement of the die collet B is effected by the action of cam 150 on slider 104, the pick-up tube C is actuated by pivotal operation of leg 190 as produced by the action of cam 160.

Now referring back to FIGURES 1, 2 and 5, the feed leg 190 is pivotally supported on shoulder screw 176 mounted within a channeled cantilever member 178. The overhead member 178 is fixedly secured to the frame D and support 128 by side clamp 179. The overhead member 187 projects through an opening 186 in face plate 188 and is bent forwardly of the fulcrum 176 so that the end is cantilevered over the dice dish F. The leg 190 is protected forward of the face plate 188 on top, bottom and one side by the flanges and side wall of the channeled cantilever member 178. The rear end of the leg 190 is coupled to clevis rod 192. The lower end of clevis rod 192 is in turn connected to bell crank 194 which is likewise pivotally supported on shaft 134. Follower roller 196 at the lower end of bell crank 194 is urged into engagement with the face of cam 160 by virtue of the greater moment load of the free forward end of the leg 190.

Figure 13:
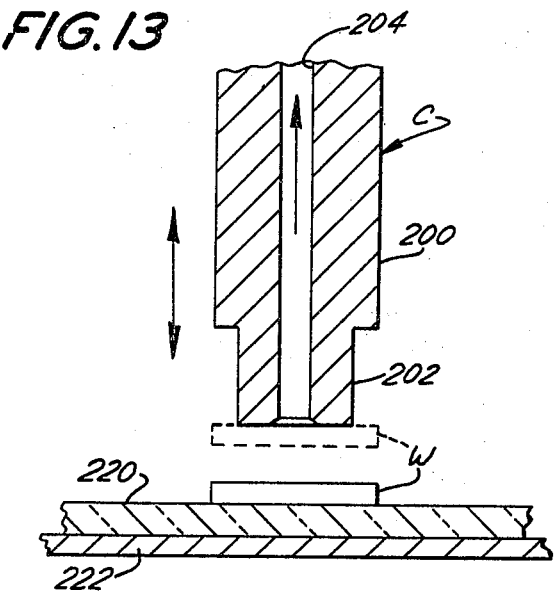
FIGURE 13 is a sectional elevational view taken of the pick-up tube.

The very end of the cantilevered member 178 has a vertically disposed sleeve 198 for slidably supporting the pick-up tool C. In die pick-up position, the axis of the sleeve 198 is nominally at the center of the dice dish F. See FIGURES 1 and 2. The pick-up tube C may be the size of a heavy gauge hypodermic needle with a body portion 200 and a reduced lower end 202. A bore 204 extends longitudinally entirely through the pick-up tube C and is connected through tubing 206 at its upper end to a vacuum or exhaust system by way of an electrically actuated valve (not shown). The very bottom of the pick-up tool C is ground flat and the tip has a soft coating, such as "Teflon," to prevent marring of the die C as the tube descends thereon. See enlarged view of pick-up tube C in FIGURE 13. The reduced end 202 facilitates magnified observation of the pick-up position through microscope G along broken lines G1–G2 of FIGURE 1 without obstruction. A collar 208 is mounted to the upper portion of the body 200 and acts as both a load and as a final rest stop when seated on sleeve 198 to prevent the tip of the tool C from descending below a predetermined level. Lift pin 210 extends laterally from the collar 208 and is engaged by a toe 212 at the end of lifting leg 190. As shown in FIGURE 1, a fixed point on the dice dish F which contains a plurality of wafers is under microscope observation. The microscope G has cross hairs which are aligned with a pick-up position. A mirror 214 is supported by a bracket 216 on the cantilever member 178 and reflects the direction of microscope observation along lines G1–G2. The mirror 214 can also be swung out of the way so that observation of the bonding of the wafer W to the header H can be made directly along lines G1–G3 to permit the operator to view the bonding.

Referring now to FIGURE 10, the dice dish assembly F comprises a glass mirrored disk 220 supported within bezel 222. The bezel 222 is mounted upon a post 224 which upstands from pedestal 226. The pedestal 226 acts as a finger piece or "chessman" for slidably manipulating a die W directly under the pick-up tube C. Pads 228 mounted in the sole of chessman pedestal 226 are slidably supported on the upper surface of circular pan 230. The pan 230 is secured to shaft pin 232. The pin 232 is journalled along a vertical axis in bearing 234 and the hub of the pan 230 site upon thrust bearing 236. The bearings 234 and 236 are mounted within boss 238 of frame D. Knurled knob 240 is secured to the bottom of the pin 232 and acts as a means for rotating the tray F about a vertical axis in order to pre-orient a die W at the microscope cross hairs about a polar axis with respect to the feed tube C so that the lifted wafter will approximately register with the receiving pocket 20 in the indexing tray A. Arm rest 242 provides a convenient means for the operator to support his hand and manipulate the dice dish F by the pedestal chessman 226 until a wafer W is situated at a target position with respect to the cross hairs as observed through microscope G.

Referring now to FIGURES 1, 2 and 9, the present apparatus and method is directed to an automatic operation in which the sequence of events are geared to and related to a line or strip of headers H or mounting bases coupled together and to which the wafers W are to be bonded. The bonding station is the referenced position at which the die collet B descends. For example, a strip of headers or mounting bases H are fed along a track 245. The die bonding station may utilize a heat platform at which the temperature of the particular header is elevated to perform eutectic bonding (not shown) or an ultrasonic bonding tool 100, as illustrated, wherein the bond is made by a combination of heat and controlled-load scrubbing of the wafer W at high frequency parallel to and against the header surface. Combinations of the heat and vibrational scrubbing can be employed as well as any other welding system, it being understood that the mode of bonding is merely illustrative of the facility and adaptability of the instant invention. In the event heat column is used, a heat shelf 248 is arranged under the ultrasonic device 100 to protect the latter from thermal conditions. Finally, it is to be observed that a plurality of regularly spaced holes 250 are longitudinally arranged along the strip of headers H to initiate and cycle the operations automatically in a predetermined sequence. Thus, indexing the header strip H, die placement, bonding time, cooling time, and indexing of the dispensing tray A are all programmed automatically if it is desired to use a fully loaded dice tray. Also loading the tray A can be performed semi-automatically as illustrated by the pick-up tube C.

Assuming that one of the indexing holes 250 has stopped the tape or strip H so that one mounting base is directly below a referenced work station. An electrical switch tripped by such indexing hole might close the circuit to one of the segments 182 on commutator dish 180 located in cycle assembly J. Motor 142 is rotated through a single revolution by way of cluch and gear train 146. Cam 150 causes collet B to descent into a pocket 20. Tapered end 90 is guided gently therein by engagement with the sloped side walls of the pocket as shown in FIGURE 14. Counter spring 168 balances the mass of slider 104 to waft the collet into precise registration. The wafer W deposited at the bottom of pocket 20 is now oriented with the cupulate cavity 92. At this stage, a vacuum switch is tripped through one of the segments 182 on commutator disk 180 and the bore 94 of the collet B is coupled to an exhaust system. The wafer W in the pocket 20 is sucked up against the roof of the cupulate cavity 92 and grasped thereby. The wafer W is oriented in plane-parallel disposition and about a polar axis with respect to the bonding position. Cam 150 now elevates the slider 104 and raises the top 90 of collet B with its suspended wafer out of the pocket. Cam 140 retracts the horizontal slider 120 so that the wafer is directly over the header bonding station and precisely in alignment with a mounting base, the adjustments for the latter location having previously been made during set-up to such referenced position. Cam 150 now permits descent of the collet B with a controlled force so that the die W is pressed into engagement with the mounting base in exact orientation. Vacuum is released. Ultrasonic vibrator 100 is automatically actuated for a predetermined length of time and shuts off. As the slider 104 ascends, cam 170 actuates the indexing of the tray assembly A. Rod 84 moves to the left, and actuator arm 94 moves inner slider 64 to left until indexing pawl 51 catches the notched edge 22 of ring 24. Further motion to the left draws ring 24 out of engagement with lock pawl 80. At the point of greatest retraction, follower 49 of indexing lever 50 engages oblique wall of cam slot 48. Pawl 51 of indexing lever 50 rotates counter-clockwise through an arc equal to the pitch of the teeth 22. The periphery of indexing ring 24 is now biased into engagement with lock pawl 80. A fresh pocket 20 loaded with a wafer has been indexed into position to receive the tapered tip of collet B once more. Random searching for the die has been eliminated.

Meanwhile the operator manipulates the dice dish F until a wafer is under the target position of the pick-up tube C by aligning the wafer with the reticle cross hairs during observation through microscope G. Polar orientation can be roughly obtained by rotation knob 240. Cam 160 pivots leg 190 counterclockwise at same time collet B descends into pocket 20. Toe 212 is released from latch pin 210 allowing needle 200 to slidably descend through sleeve 208. Reduced end 202 of tube C lightly touches down upon die W or immediately thereover. Vacuum is applied through tubing 206 as actuation of reduced pressure valve is electrically tripped by commutator disk 180. Wafer W is now picked up at end of tube C and carried over to pocket 20 simultaneously with horizontal movement of die collet B to bonding station. Vaccum is released to tube C and die W is deposited into pocket 20. The die W pre-orients itself as it slides down sloping walls of pocket. It is to be observed that the pocket configuration can be formed to match almost any regular dice configuration such as rectangular, triangular or circular. The tapered die collet B and its cupulate cavity is appropriately modified to fit the pocket and wafer accordingly so as to be complementary therewith.

Although this invention has been described in considerable detail, such description is intended as being illustrative rather than limiting since the invention may be variously embodied, and the scope of the invention is to be determined as claimed.

What is claimed is:

1. Apparatus for dispensing and securing semiconductor dice to mounting devices comprising:

dispensing means for individually receiving the dice within compartments, means constituting downwardly converging walls in each of said compartments pre-orienting a die deposited therein a predetermined disposition, die collet means having a tapered tip portion complementary with the convergent walls, means for successively advancing and locking said dispensing means so that each compartment containing a die is moved one at a time into an indexed position with said die collet means, a work station for successively advancing the mounting devices to a predetermined referenced location thereon, means for inserting said collet means into an indexed compartment containing a die until the tapered tip is guided into intermeshing engagement with said convergent walls and in aligned disposition with the die therein, means on said collet means for grasping the die in the tip thereof, means for retracting said collet means with respect to said dispensing means, and means for relatively moving said collet means with respect to said work station and urging the grasped die into controlled force contact with the mounting device at the referenced location.

2. The invention of claim 1 wherein the dice are square in configuration and the compartments are of inverted pyramidal construction.

3. The invention of claim 1 wherein the bottom of said compartments have a configuration substantially congruent with the perimeter of said dice.

4. The invention of claim 3 wherein said dispensing means comprises a rotatable ring member having said compartments regularly spaced circumferentially about the margin thereof.

5. The invention of claim 4 including a die pick-up and feed means actuated with said collet means and operable at the diametrically opposed portion of said ring, a dish containing a plurality of random deposited dice, means to manipulate said dish so that die will be in registration with said pick-up and feed means when said collet means has been inserted within a compartment, means on said pick-up and feed means to lift a die when said collet means has grasped an indexed die, and means to deposit a lifted die into an empty compartment opposite said die extracted compartment when said collet means is urged into contact with the mounting device.

6. The invention of claim 5 wherein said die lifting means on said pick-up and feeding means comprised vacuumed suction means.

7. The invention of claim 6 wherein the die grasping means on said collet means comprises vacuum suction means.

References Cited

UNITED STATES PATENTS

| | | | |
|---|---|---|---|
| 2,651,429 | 9/1953 | Von Hofe | 156—272 |
| 2,915,201 | 12/1959 | Calehuff | 214—1 |
| 3,144,168 | 8/1964 | Campbell | 221—211 |
| 3,357,090 | 12/1967 | Tiffany | 29—470 |

GERALD M. FORLENZA, Primary Examiner

GEORGE F. ABRAHAM, Assistant Examiner

U.S. Cl. X.R.

29—208; 214—1; 221—211; 294—64